(12) United States Patent  (10) Patent No.: US 7,679,033 B2
Westfield et al.  (45) Date of Patent: Mar. 16, 2010

(54) PROCESS FIELD DEVICE TEMPERATURE CONTROL

(75) Inventors: Brian L. Westfield, Chanhassen, MN (US); Kelly M. Orth, Apple Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 493 days.

(21) Appl. No.: 11/238,656

(22) Filed: Sep. 29, 2005

(65) Prior Publication Data

US 2007/0068922 A1  Mar. 29, 2007

(51) Int. Cl.
*H05B 3/68* (2006.01)
*H05B 1/02* (2006.01)
*H05B 3/78* (2006.01)

(52) U.S. Cl. .................. 219/447.1; 219/490; 392/485

(58) Field of Classification Search ... 219/443.1–468.2, 219/490–497; 392/485–489; 73/700–708, 73/717–727
See application file for complete search history.

(56) References Cited

U.S. PATENT DOCUMENTS

| | | | |
|---|---|---|---|
| 3,461,416 A | 8/1969 | Kaufman | 338/4 |
| 3,836,786 A | 9/1974 | Lowther | 422/186.19 |
| 3,842,241 A * | 10/1974 | Isaacson et al. | 392/444 |
| 3,903,869 A | 9/1975 | Bancalari | 128/202.12 |
| 4,295,117 A | 10/1981 | Lake et al. | 338/4 |
| 4,365,138 A * | 12/1982 | Hess | 219/200 |
| 4,368,575 A | 1/1983 | Erichsen et al. | 29/610 |
| 4,507,973 A | 4/1985 | Barr et al. | 73/724 |
| 4,738,276 A | 4/1988 | Adams | 137/343 |
| 4,785,669 A | 11/1988 | Benson et al. | 73/718 |
| 4,875,135 A | 10/1989 | Bishop et al. | 361/283 |
| 4,878,458 A | 11/1989 | Nelson | 122/4 |
| 4,932,265 A | 6/1990 | Skuratovsky et al. | 73/727 |
| 4,984,468 A | 1/1991 | Hafner | 73/727 |
| 5,056,373 A | 10/1991 | Gray | 73/861.71 |
| 5,115,676 A | 5/1992 | Lee | 73/706 |
| 5,125,275 A | 6/1992 | Wilda et al. | 73/756 |
| 5,134,887 A | 8/1992 | Bell | 73/718 |
| 5,165,281 A | 11/1992 | Bell | 73/718 |
| 5,174,014 A | 12/1992 | Erichsen et al. | 29/621.1 |
| 5,285,690 A | 2/1994 | Koen et al. | 73/727 |

(Continued)

FOREIGN PATENT DOCUMENTS

EP  0 660 644  12/1994

(Continued)

OTHER PUBLICATIONS

"Pressure Transmitter for High Purity Gases," Exact Series, 5 pages (Feb. 1999).

(Continued)

*Primary Examiner*—Sang Y Paik
(74) *Attorney, Agent, or Firm*—Westman, Champlin & Kelly, P.A.

(57) ABSTRACT

A field device system for use in an industrial process includes a field device configured to couple to the industrial process and monitor or control the industrial process. The field device provides a temperature control signal output related to a temperature of the field device. A heater coupled to the field device heats the field device in response to the temperature control signal.

24 Claims, 5 Drawing Sheets

U.S. PATENT DOCUMENTS

| | | | |
|---|---|---|---|
| 5,329,819 A | 7/1994 | Park et al. | 73/724 |
| 5,461,922 A | 10/1995 | Koen | 73/756 |
| 5,542,300 A | 8/1996 | Lee | 73/724 |
| 5,560,362 A | 10/1996 | Sliwa et al. | 600/439 |
| 5,565,172 A | 10/1996 | Capuano et al. | 422/83 |
| 5,625,152 A | 4/1997 | Pandorf et al. | 73/756 |
| 5,637,802 A | 6/1997 | Frick et al. | 73/724 |
| 5,656,780 A | 8/1997 | Park | 73/724 |
| 5,661,245 A | 8/1997 | Svododa et al. | 73/726 |
| 5,672,832 A | 9/1997 | Cucci et al. | 73/861.52 |
| 5,693,887 A | 12/1997 | Englund et al. | 73/723 |
| 5,731,522 A | 3/1998 | Sittler | 73/708 |
| 5,781,024 A | 7/1998 | Blomberg et al. | 324/763 |
| 5,781,878 A * | 7/1998 | Mizoguchi et al. | 701/109 |
| 5,796,007 A | 8/1998 | Panagotopulos et al. | 73/716 |
| 5,798,462 A | 8/1998 | Briefer et al. | 73/722 |
| 5,808,206 A | 9/1998 | Pandorf et al. | 73/756 |
| 5,811,685 A | 9/1998 | Grudzien, Jr. | 73/724 |
| 5,852,244 A | 12/1998 | Englund et al. | 73/706 |
| 5,861,558 A | 1/1999 | Buhl et al. | 73/777 |
| 5,867,886 A | 2/1999 | Ratell et al. | 29/595 |
| 5,899,962 A | 5/1999 | Louwagie et al. | 702/138 |
| 5,911,162 A | 6/1999 | Denner | 73/718 |
| 5,915,281 A | 6/1999 | Sparks | 73/862.581 |
| 5,932,332 A | 8/1999 | Pandorf et al. | 428/220 |
| 5,939,639 A | 8/1999 | Lethbridge | 73/724 |
| 5,942,692 A | 8/1999 | Haase et al. | 73/724 |
| 5,965,821 A | 10/1999 | Grudzien | 73/724 |
| 5,974,893 A | 11/1999 | Balcarek et al. | 73/714 |
| 6,003,380 A | 12/1999 | Sasaki et al. | 73/720 |
| 6,009,757 A | 1/2000 | LeComte et al. | 73/724 |
| 6,017,143 A * | 1/2000 | Eryurek et al. | 700/51 |
| 6,029,525 A | 2/2000 | Grudzien | 73/718 |
| 6,050,145 A | 4/2000 | Olson et al. | 73/706 |
| 6,370,448 B1 | 4/2002 | Eryurek | 700/282 |
| 6,465,271 B1 | 10/2002 | Ko et al. | 438/48 |
| 6,510,740 B1 | 1/2003 | Behm et al. | 73/708 |
| 6,588,280 B1 | 7/2003 | Quigley et al. | 73/708 |
| 6,612,176 B2 | 9/2003 | Poulin et al. | 73/708 |
| 6,772,640 B1 | 8/2004 | Quigley et al. | 73/718 |
| 7,000,479 B1 | 2/2006 | Poulin et al. | 73/708 |
| 2002/0083774 A1 | 7/2002 | Poulin et al. | 73/708 |
| 2002/0174857 A1 | 11/2002 | Reddy et al. | 123/520 |
| 2003/0012563 A1 | 1/2003 | Neugebauer et al. | 382/365 |
| 2003/0221491 A1 | 12/2003 | Albert et al. | 73/724 |
| 2004/0169771 A1 | 9/2004 | Washington et al. | 348/374 |
| 2005/0254055 A1 | 11/2005 | Peng | 356/432 |

FOREIGN PATENT DOCUMENTS

| | | |
|---|---|---|
| JP | 5-332862 | 12/1993 |
| JP | 5-332865 | 12/1993 |
| JP | 5-332866 | 12/1993 |
| JP | 5-340828 | 12/1993 |
| JP | 6-174574 | 6/1994 |
| JP | 6-294691 | 10/1994 |
| SU | 1760388 | 9/1992 |
| WO | WO 91/13417 | 9/1991 |
| WO | WO 94/01 041 A1 | 1/1994 |

OTHER PUBLICATIONS

"Micro-Baratron Pressure Transducers," Type 870 & Type 872, 5 pages (1999).

European Office Action from corresponding European Application No. 06825182.6, dated Jun. 30, 2008.

European Search Report and Written Opinion from Application No. PCT/US2005/014267, filed Apr. 25, 2005.

* cited by examiner

PROCESS FIELD DEVICE TEMPERATURE CONTROL

BACKGROUND OF THE INVENTION

The present invention relates to field devices of the type used to couple to industrial processes. More particularly, the present invention relates to controlling the temperature of such a field device.

Industrial processes are used in a wide variety of applications to produce various types of products. For example, an oil refinery includes numerous industrial processes which are used to refine crude oil into various usable products.

Typically, processes require both monitoring and controlling. For example, one type of field device is a transmitter which can be used to monitor process variables such as pressure, flow, temperature, etc. of the process. Based upon the measured process variable, another type of field device, a controller, is used to control process variables of the process. Various types of controllers are used to adjust flow rate, control temperature, control pressure, etc.

In some installations, it is desirable that the temperature of the field device be maintained at an elevated temperature. For example, in some ultra high purity process environments such as those used in semiconductor manufacturing, if the temperature of the field device drops below a melting point of a fluid in the process, the fluid will solidify and adhere to the field device. Additionally, if the field device is temperature sensitive, errors can be reduced by maintaining the temperature of the field device.

One technique which has been used to maintain the temperature of field devices is the use of heater elements which are coupled to the field device. The heater element can, for example, include an internal temperature sensor and thermostat for controlling the temperature of the heater element. Heaters are also used if the device is placed in a cold environment, for example, during winter, a heated jacket can be used to heat the transmitter and assorted piping. However, the heated jacket must be switched off during summer to prevent overheating.

SUMMARY

A field device system for use in an industrial process includes a field device configured to couple to the industrial process and monitor or control the industrial process. The field device provides a temperature control signal output related to temperature of the field device. A heater coupled to the field device heats the field device in response to the temperature control signal.

DETAILED DESCRIPTION

As discussed in the background section, external heaters have been used to heat field devices. For example, transmitters which are configured to operate in processes which include pressures of substantially zero (vacuum), external heaters are used to control ambient temperature of process transmitters. The heaters typically wrap around the outside surface of the transmitter to maintain a constant operating temperature. The transmitters are normally heated to temperatures which are warmer than the process being monitored to avoid becoming a cold spot in the system. This prevents process material from condensing directly on the sensor and degrading performance of the field device.

However, in such configurations the temperature measured may not accurately indicate the temperature of the surface of the field device which interfaces with the process. This is because the external heater uses an external sensor and there can be significant thermal lag and thermal variations between the surface of the field device which contacts the process and the external temperature sensor. The present invention includes the use of a temperature sensor which is located internally to the field device for use in controlling a heater element coupled to the field device. In various configurations, communication from the field device to the external heater is used to control heating of the field device.

As discussed in the background section, heated jackets have also been used to heat process transmitters and associated piping when they are placed in a cold environment. For example, during the winter, the heated jacket can be used to keep equipment warm. However, when summer comes, the heater must be turned off to prevent the equipment from being overheated. Unfortunately, if the operator forgets to turn the heater off during the summer, the equipment can fail or otherwise be damaged. Similarly, an operator can forget to turn the heater on prior to the cold arriving which can also lead to failure. The present invention provides an automated apparatus and technique for controlling such a heater to thereby eliminate the possibility of an operator failing to turn the heater on or off at the appropriate time.

Figure 1:
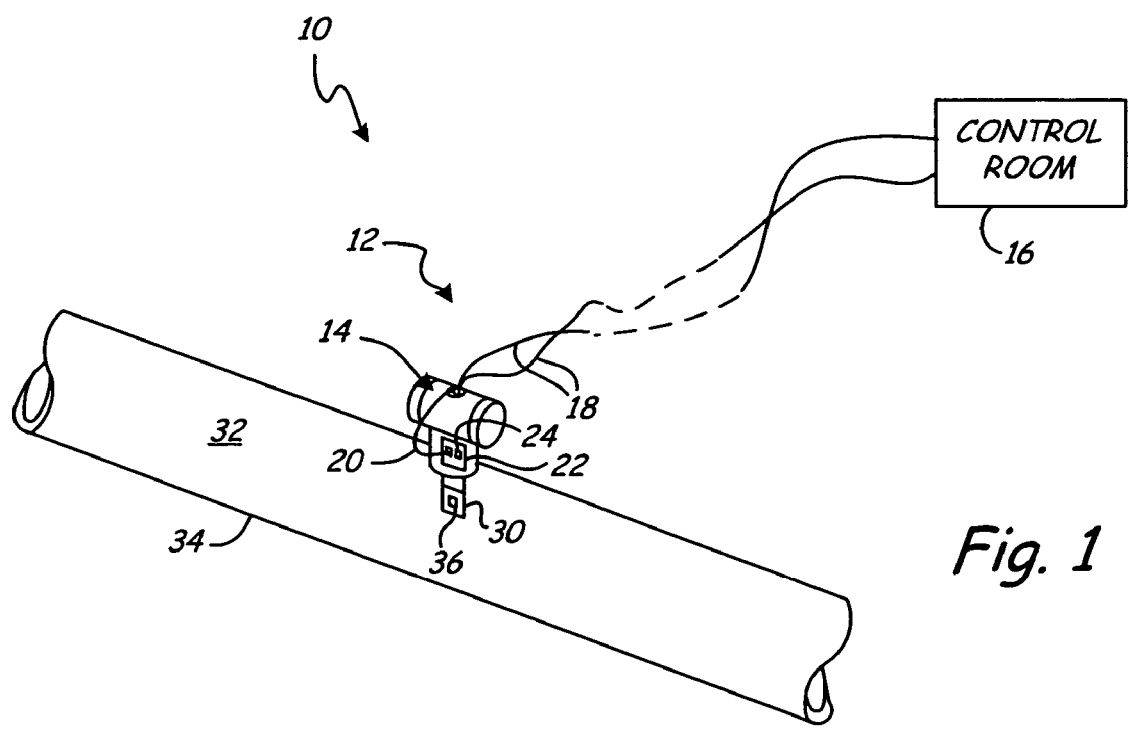
FIG. 1 is a simplified diagram of a process control system.

FIG. 1 is a simplified diagram of a process control system 10 including a field device system 12 in accordance with the present invention. Field device system 12 includes field device 14 which is illustrated as coupled to control room 16 over two-wire process control loop 18. The process control loop 18 can operate in accordance with any communication technique, including process control standard communication techniques such as a 4-20 mA protocol, the HART communication protocol, a Field Bus protocol or others. Field device 14 provides a temperature control signal output 20 which is coupled to a heater 22 having a heater element 24. The process interface element 30 of the field device is configured to couple to process fluid 32 carried in process piping 34. The process interface 30 can be, for example, a sensor to sense a process variable, or a control element to control a process variable. Process interface element 30 is shown as including temperature sensor 36. Although in FIG. 1 temperature sensor 36 is shown as located in interface element 30, the temperature sensor 36 can be located anywhere within the field device 14.

During operation, in one configuration the field device 14 transmits a process variable to a remote location such as control room 16. In another configuration, if field device 14 is configured as a controller, device 14 receives a control signal over process control loop 18 for use in controlling a process variable of the process.

The temperature control signal output 20 is related to the temperature of the field device 14 and is based upon the temperature sensed by temperature sensor 36. The heater 22 controls heater element 24 in response to the temperature control signal output 20 to heat the transmitter 14 to a desired temperature. The particular control algorithm used to control the temperature can be selected as desired and can be implemented in field device 14 or in heater 22. Further, the temperature control signal output 20 can be in accordance with any communication technique or control including digital or analog control signals and can comprise anything from the raw temperature data to the drive signal applied to heater element 24.

It is appreciated that heater 22 may be coupled to field device 14 in a variety of methods including externally coupling the heater to a portion of the field device or locating the heater internally within the field device itself.

Figure 2A:
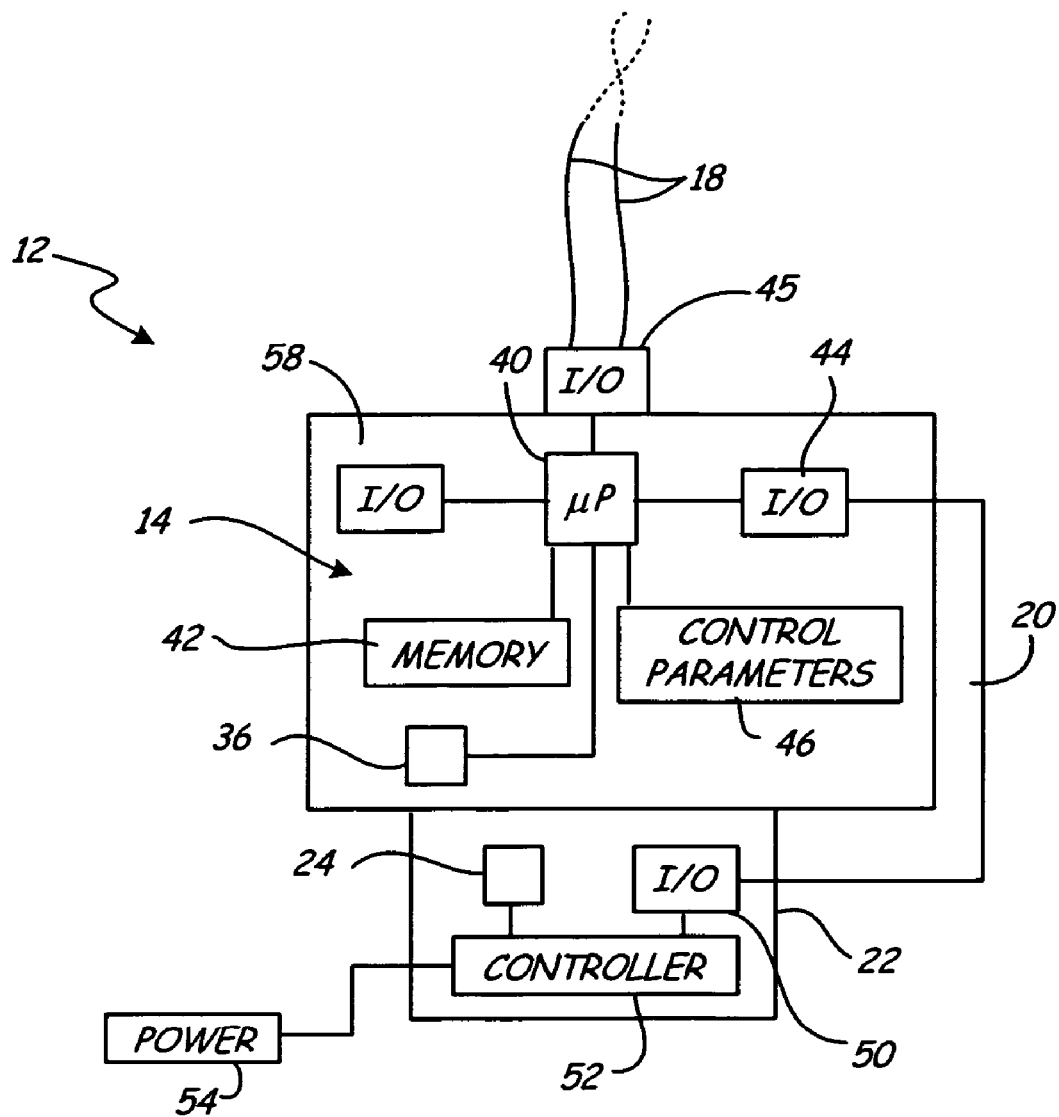
FIG. 2A is a block diagram of a example embodiment of a field device system including a heater in accordance with the invention.

FIG. 2A is a simplified diagram of field device system 12 in greater detail. As illustrated in the embodiment of FIG. 2A, field device 14 includes a microprocessor or other controller 40 coupled to memory 42, I/O or communication circuitry 44, loop I/O 45 and control parameters 46. The microprocessor 40 also couples to the internal temperature sensor 36. The control parameters 46 control the relationship between the temperature control signal 20 and the temperature sensed by temperature sensor 36. The control parameters can be programmed locally using a local interface such as, an optional local I/O 58, or can be programmed from a remote location, for example, over the two-wire process control loop 18. The temperature control signal 20 couples to I/O circuitry 50 of heater 22. A heater controller 52 controls the power supplied to heater element 24 from an external power source 54.

Although in the configuration of FIG. 2A, I/O circuits 44 and 50 are shown as coupling the field device 14 to the heater 22, in a simple configuration I/O circuits 44 and 50 can be, for example, transistor circuits. For example, I/O circuit 50 can be directly connected to heater element 24 and control power from power source 54. In such a configuration, the controller 52 may not be required.

Figure 2B:
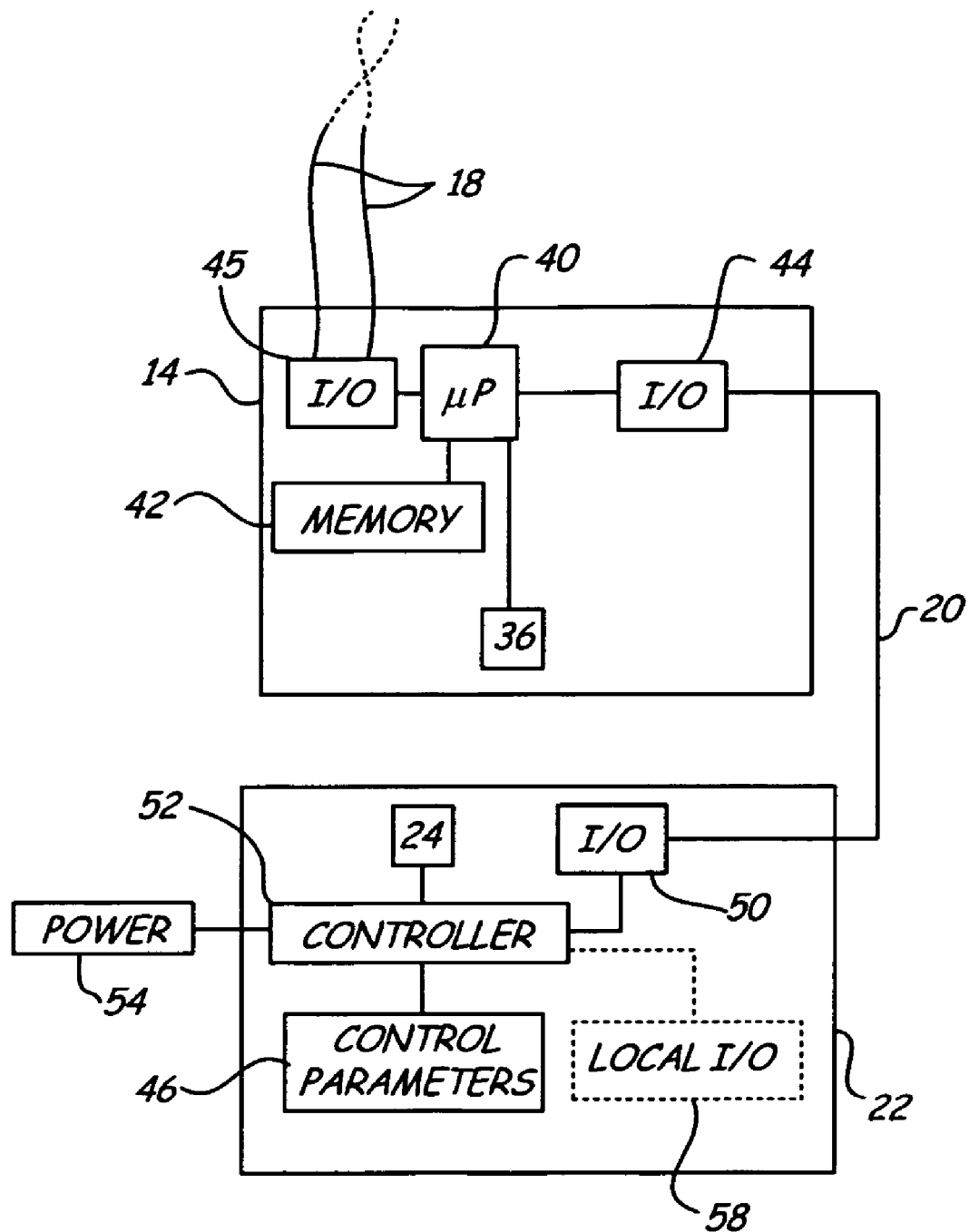
FIG. 2B is another block diagram example embodiment of the field device system including the heater.

FIG. 2B is a simplified block diagram of another example embodiment in which the control algorithm used to control the heater element 24 is implemented within heater 22. In this configuration, the control parameters 46 are contained within the memory in the heater 22 and the temperature control signal 20 can be a direct representation of the temperature sensed by the temperature sensor 36. A local input/output 58 can be provided in the heater 22.

The temperature control signal 20 can be carried on a separate databus or can be carried on a shared databus. For example, the temperature control signal 20 can be carried on two-wire process control loop 18. In such a configuration, communication circuitry 50 is configured to communicate in accordance with the protocol of information which is transmitted on the two-wire process control loop 18. One such protocol is the HART® communications protocol. The control signal 20 can be provided to heater 22 continuously, in a burst mode or periodic configuration, or can be polled or otherwise interrogated by the heater 22.

Figure 3:
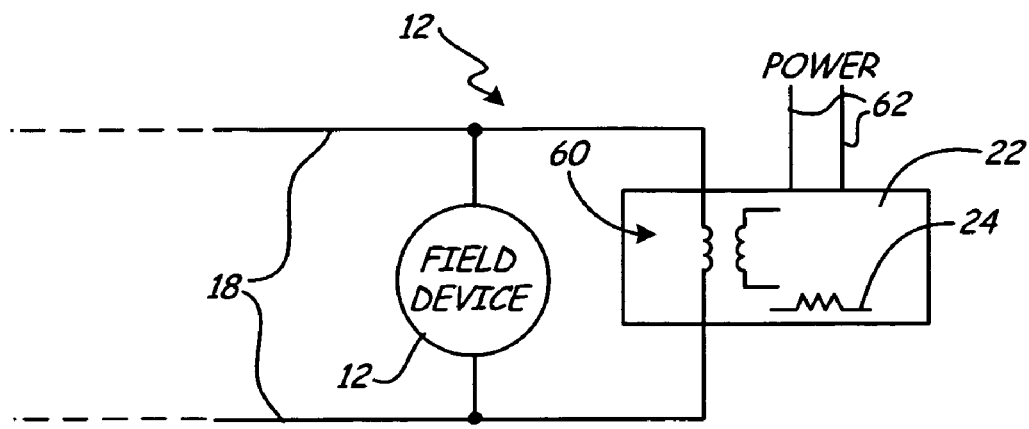
FIG. 3 shows an example configuration of the heater coupled to a 4-20 mA current loop.

FIG. 3 is a simplified schematic diagram showing one configuration of wiring for use with the present invention. In the schematic shown in FIG. 3, field device system 12 is coupled to two-wire process control loop 18. In the configuration of FIG. 3, the heater 22 is inductively coupled to process control loop 18 through transformer 60. A separate power connection 62 is used to provide power for the heater element 24. In this configuration, the commands or temperature information used to control heating of heater element 24 are provided by field device 12 over the process control loop 18. The I/O circuitry (50 in FIG. 2A) within heater 22 monitors communications on the process control loop 18 and responsively controls application of power to the heater element 24. In one example configuration, the heater 22 receives data in accordance with the HART® . Communication Protocol from field device 12 over process control loop 18.

Figure 4:
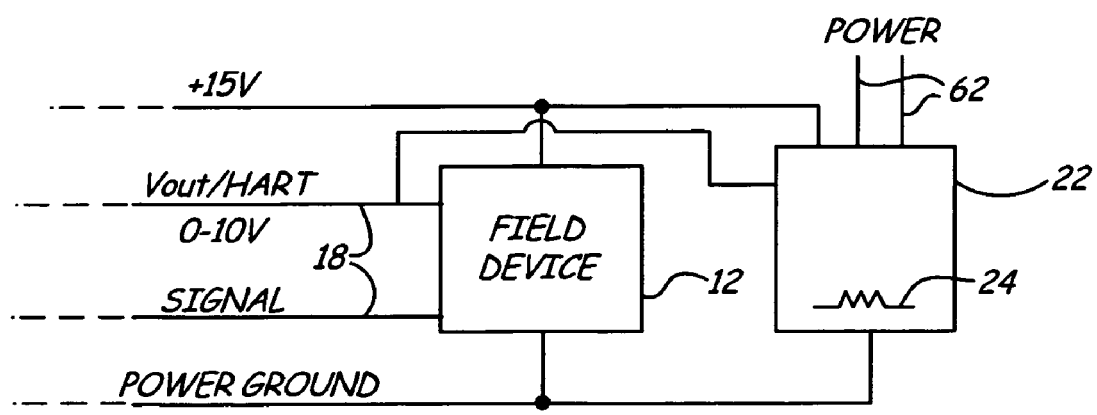
FIG. 4 is a block diagram showing a configuration in which the heater is coupled to a 0-10 volt control loop.

FIG. 4 is a simplified schematic diagram of another example wiring configuration in accordance with the invention. In FIG. 4, the field device 12 couples to a 0-10 volt process control loop 18 which communicates in accordance with the HART® Communication Protocol. In this configuration, an additional 15 volt power supply is used and couples to both the field device 12 and the heater 22. A power ground connection is also provided. In this configuration, heater 22 monitors communication transmission on control loop 18 using the techniques discussed above and responsively controls application of power to the heater element 24. In some configurations, a separate power connection 62 can be used. The heater 22 is capacitively coupled to process control loop 18 to monitor data transmission on control loop 18. As discussed above, field device 12 can communicate with heater 22 and provide a control signal or temperature data to heater 22 to control heating of heater element 24.

Figure 5:
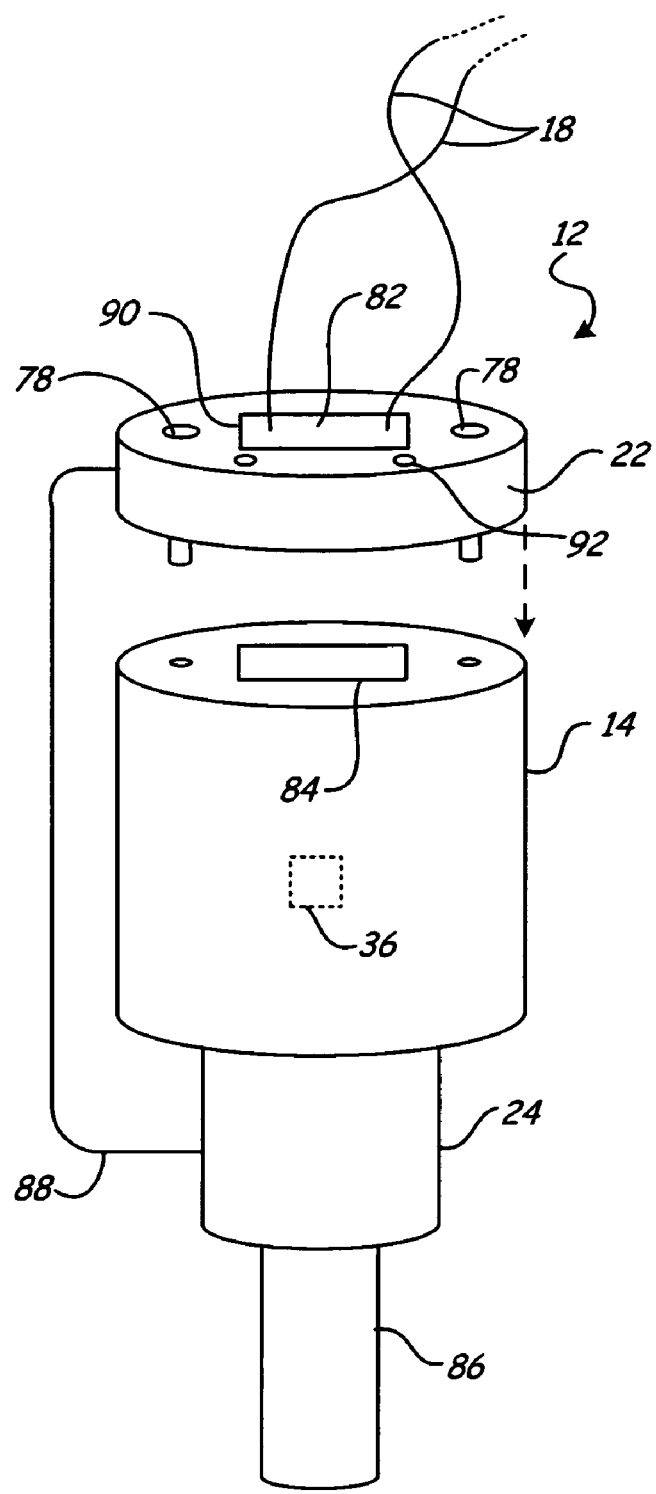
FIG. 5 is an exploded perspective view showing a heater coupled to a heater device.

FIG. 5 is an exploded perspective view of system 12 showing a configuration in which the heater 22 is mounted onto the field device 14. In the configuration of FIG. 5, heater 22 mounts on top of field device 14 through screws 78. A connector 82 on heater 22 is configured to mate with a matching connector 84 on field device 14. The connector 82 is configured to be the same as connector 84 so that the connections presented by connector 84 are the same as the connections presented by connector 82. It is through this connection 82 that heater 22 couples to the process control loop 18 and communicates with field device 14. Heater element 24 is preferably mounted on the field device 14 near the process connection 86. A connection 88 from heater 22 is used to power heater element 24 as discussed above.

As illustrated in FIG. 5, the heater 22 can be added to the field device 14 at any time, for example before or after installation. Additionally, FIG. 5 also illustrates a local output 90 and a local input 92. For example, local output 90 can be a LED or other visual indicator for observation by an operator. Local input 92 can be, for example, one or more push buttons or other types of manual input for use in programming or controlling operation of heater 22. The temperature sensor 36 is typically mounted within field device 14.

The present invention can be configured to mount locally to the transmitter where it receives power from field wiring. The heater can interface to the output signal line of the transmitter and receive communications in accordance with, for example, the HART® Communication Protocol. The information can comprise the temperature from an internal temperature sensor in the field device. The connection 88 between to the heating element 24 and field device can be over any appropriate connection. This includes a databus, a stand alone two-wire process control loop, an extension of loop 18, etc.

The heater 22 can be configured during manufacture, or in the field by communicating with heater 22 over the process control loop 18. For example, the set point of the thermostat and other aspects of the heater control algorithm can be externally programmed. An operator can select any set point within the temperature operating range of the transmitter. This enables the user to tailor the heat applied to the field device 14 to a particular process. Additionally, this allows a single heater configuration to be used in many different applications and simply programmed accordingly.

As discussed above, the heater 22 can periodically poll the field device 14 to obtain temperature readings. In another configuration, the field device 14 periodically transmits temperature readings which are received by the heater 22. The heater 22 can include a microprocessor or other control circuitry to implement a control algorithm. In one example implementation, the controller 52 shown in FIG. 2A implements an PID control algorithm to control the heater element 24.

In another aspect, thermal overload protection can be provided within the heater 22. If a fault in the heater element 24 occurs that causes the temperature to rise beyond the set point, or to an unsafe operating region, then the circuitry can shut down the heater element 24 and provide a visual indication. This information can also be transmitted on the process control loop 18. In another aspect, the heater 22 is capable of performing diagnostics on the field device 14. For example, the measured temperature can be used to provide trending information concerning the corrected sensor temperature. This information can be used for the early detection of a failing heater element. This type of status information can be made available to the user through a local indicating or by communication over the process control loop 18.

Although the present invention has been described with reference to preferred embodiments, workers skilled in the art will recognize that changes may be made in form and detail without departing from the spirit and scope of the invention. The connection to the control loop by heater 22 typically provides DC isolation, for example through inductive or capacitive coupling. In one particular configuration, field device 14 is for use in high purity vacuum process.

What is claimed is:

1. A field device system for use in an industrial process configured to couple to a process control loop comprising:
    a field device having a housing configured to couple to the industrial process and monitor or control the industrial process, the field device including a temperature control signal output which provides a temperature control signal related to a temperature of the field device, the field device including a process variable sensor configured to sense a process variable of the industrial process and I/O circuitry configured to couple to a process control loop and transmit information related to the process variable; and
    a heater mounted to the housing of the field device and externally of the field device, the heater electrically coupled to the temperature control signal output configured to heat the field device in response to the temperature control signal.

2. A field device system of claim 1 wherein the process control loop comprises a two-wire process control loop related to the measured process variable.

3. The field device system of claim 1 wherein the field device includes an internal temperature sensor and the temperature control signal is related to the temperature of the temperature sensor.

4. The field device system of claim 1 wherein the temperature control signal comprises a digital signal.

5. The field device system of claim 2 wherein the temperature control signal is provided on the two-wire process control loop coupled to the field device and to the heater.

6. The field device system of claim 5 wherein the electrical connection provides isolation of DC signals.

7. The field device system of claim 1 wherein the field device is configured to couple to a high purity vacuum process.

8. The field device system of claim 1 wherein the heater couples to an external power supply.

9. The field device system of claim 1 wherein the heater includes a heater element and wherein a relationship between the temperature control signal and heat from the heater element is programmable.

10. The field device system of claim 9 wherein the relationship between the temperature control signal and heat from the heater element is programmed through a local interface.

11. The field device system of claim 9 wherein the relationship between the temperature control signal and heat from the heater element is programmed through digital signals received in accordance with the HART® communications protocol from the process control loop.

12. The field device system of claim 1 wherein the process variable sensor comprises a pressure sensor configured to sense a pressure of the industrial process.

13. The field device system of claim 12 wherein the pressure sensor includes a temperature sensor and the temperature control signal is related to the temperature of the temperature sensor.

14. The field device system of claim 1 wherein the heater includes a heater element and a controller configured to implement a control algorithm and responsively control heat from the heater element as a function of the temperature control signal.

15. The field device system of claim 1 wherein the heater includes thermal overload protection.

16. The field device system of claim 1 wherein the heater includes a local output configured to provide an indication of heater status.

17. The field device system of claim 1 wherein the heater is configured to diagnose impending failure of a heater element of the heater.

18. A method reducing accumulation of process material on a field device in an industrial process coupled to a process control loop, comprising:
    sensing a process variable of the industrial process;
    transmitting an output on the process control loop related to the sensed process Variable;
    mounting a heater to a housing of the field device, the heater positioned externally to the field device;
    sensing an internal temperature of the field device;
    providing a temperature control signal output related to the sensed temperature;
    coupling the temperature control signal output to a heater which is thermally coupled to the field device; and
    responsively heating the field device with the heater as a function upon the temperature control signal output.

19. The method of claim 18 including measuring temperature of the field device with an internal temperature sensor and the temperature control signal output is related to temperature of the temperature sensor.

20. The method of claim 18 wherein the temperature control signal output comprises a digital signal.

21. The method of claim 18 wherein the temperature control signal output is provided on the process control loop coupled to the field device and is further coupled to the heater.

22. The method of claim 18 wherein the heater includes a heater element and wherein a relationship between the temperature control signal output and heat from the heater element is programmable.

23. The method of claim 18 including diagnosing impending failure of a heater element of the heater.

24. The method of claim 18 including controlling heating of the field device to prevent freezing of the device.

* * * * *

UNITED STATES PATENT AND TRADEMARK OFFICE
CERTIFICATE OF CORRECTION

PATENT NO. : 7,679,033 B2
APPLICATION NO. : 11/238656
DATED : March 16, 2010
INVENTOR(S) : Brian L. Westfield et al.

It is certified that error appears in the above-identified patent and that said Letters Patent is hereby corrected as shown below:

On the Title page, item (75), change "Chanhassen" to --Victoria--.

In the Claims:

Column 6, Claim 18, line 35, change "Variable" to --variable--.

Signed and Sealed this
Twenty-sixth Day of July, 2011

David J. Kappos
*Director of the United States Patent and Trademark Office*